(12) United States Patent
Fujiwara et al.

(10) Patent No.: US 12,525,866 B2
(45) Date of Patent: Jan. 13, 2026

(54) CONTROL DEVICE AND POWER CONVERSION DEVICE

(71) Applicant: Mitsubishi Electric Corporation, Tokyo (JP)

(72) Inventors: Shuhei Fujiwara, Tokyo (JP); Ryosuke Uda, Tokyo (JP); Yoshiyuki Kono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 276 days.

(21) Appl. No.: 18/549,662

(22) PCT Filed: Mar. 19, 2021

(86) PCT No.: PCT/JP2021/011483
§ 371 (c)(1),
(2) Date: Sep. 8, 2023

(87) PCT Pub. No.: WO2022/195872
PCT Pub. Date: Sep. 22, 2022

(65) Prior Publication Data
US 2024/0154519 A1    May 9, 2024

(51) Int. Cl.
*H02M 7/48* (2007.01)
*H02M 1/08* (2006.01)
*H02M 1/32* (2007.01)

(52) U.S. Cl.
CPC .............. *H02M 1/08* (2013.01); *H02M 1/32* (2013.01); *H02M 7/48* (2013.01)

(58) Field of Classification Search
CPC ........ H02M 1/08; H02M 1/081; H02M 1/082; H02M 1/32322; H02M 1/325; H02M 7/48; H02M 7/4807; H02M 7/42
See application file for complete search history.

(56) References Cited

U.S. PATENT DOCUMENTS

| 2009/0251083 | A1* | 10/2009 | Kinpara | H02P 5/74 318/400.11 |
| 2010/0164416 | A1* | 7/2010 | Yamada | H02P 27/08 318/400.13 |
| 2011/0241583 | A1* | 10/2011 | He | H02P 27/08 318/400.09 |

FOREIGN PATENT DOCUMENTS

| JP | 2019080476 A | 5/2019 |
| JP | 2020043688 A | 3/2020 |

OTHER PUBLICATIONS

Extended European Search Report dated Mar. 20, 2024, issued in the corresponding European Patent Application No. 21931618.9, 9 pages.

(Continued)

*Primary Examiner* — Nguyen Tran
(74) *Attorney, Agent, or Firm* — BUCHANAN, INGERSOLL & ROONEY PC (57) ABSTRACT

A control device includes a power generator simulation unit to generate a voltage command value, and a signal generation unit to generate a control signal for the power converter. The power generator simulation unit includes a first integrator to time-integrate a first difference between effective power and a target value of the effective power and output a first angular frequency, a second integrator to time-integrate the first angular frequency and output a phase of an AC voltage, and a voltage command generation unit to generate the voltage command value based on the AC voltage, a target value of the AC voltage, and the phase. When a voltage difference between the AC voltage and the target value of the AC voltage is greater than a threshold, the first integrator outputs a difference between an angular frequency of the AC voltage and a reference angle frequency as the first angular frequency.

10 Claims, 8 Drawing Sheets

(56) References Cited

OTHER PUBLICATIONS

Rosso, et al., "Current Limitation Strategy For Grid-Forming Converters Under Symmetrical And Asymmetrical Grid Faults", IEEE Energy Conversion Congress and Exposition (ECCE), Oct. 11, 2020, pp. 3746-3753.

International Search Report (PCT/ISA/210) with translation and Written Opinion (PCT/ISA/237) mailed on Jun. 1, 2021, by the Japan Patent Office as the International Searching Authority for International Application No. PCT/JP2021/011483. (8 pages).

Communication pursuant to Article 94(3) EPC dated Sep. 3, 2025, issued in the corresponding European Patent Application No. 21931618.9, 6 pages.

Wu et al., "Design-Oriented Transient Stability Analysis of Grid-Connected Converters with Power Synchronization Control", IEEE Transactions on Industrial Electronics, vol. 66, No. 8, 2018, pp. 6473-6482 (11 pages).

\* cited by examiner

CONTROL DEVICE AND POWER CONVERSION DEVICE

TECHNICAL FIELD

The present disclosure relates to a control device and a power conversion device.

BACKGROUND ART

In recent years, many dispersed-type power sources using renewable energy, such as solar power generation facilities, have been introduced into power systems. In many cases, a dispersed-type power source is connected to a power system via a power converter. Accordingly, if the number of dispersed-type power sources connected to a power system increases, the ratio of synchronous machines connected to the power system decreases, and inertia energy within the power system decreases. Thus, there has been proposed virtual synchronous machine control that compensates for decreased inertia energy by causing a power converter to perform a behavior similar to that of a synchronous machine.

A power converter including voltage control-type virtual synchronous machine control (hereinafter also referred to as a "virtual synchronous machine") is controlled to simulate a behavior in a case where a synchronous power generator to be simulated is connected to a power system. The behavior of the synchronous power generator to be simulated is implemented by solving a swing equation. For example, Japanese Patent Laying-Open No. 2020-43688 (PTL 1) considers performing overcurrent suppression, in a converter including virtual synchronous control, while maintaining virtual synchronous machine control.

CITATION LIST

Patent Literature

PTL 1: Japanese Patent Laying-Open No. 2020-43688

SUMMARY OF INVENTION

Technical Problem

Since a voltage control-type virtual synchronous machine controls a voltage to operate as a voltage source, it cannot control a current. Accordingly, an overcurrent may occur during a system disturbance or the like, and a power converter may be stopped. In PTL 1, there is provided compensation means for compensating for an output voltage command value in order to suppress an overcurrent. The compensation means is configured to set, on condition that the output voltage command value moves outside a control circle, a compensation output voltage command value existing on the control circle as the output voltage command value. Although an overcurrent is thereby suppressed, this output voltage command value is not based on the result of a swing equation, and thus the synchronous power generator to be simulated enters a state where it cannot synchronize with a power system. Therefore, when a period for which an overcurrent is suppressed increases, step-out may occur in performing control that simulates the synchronous power generator. In this case, the control that simulates the synchronous power generator cannot be stably performed even after disturbance of the power system is settled.

An object in an aspect of the present disclosure is to provide a control device and a power conversion device capable of stably performing control that simulates a synchronous power generator over a power converter while suppressing an overcurrent.

Solution to Problem

According to an embodiment, there is provided a control device for controlling a power converter to convert direct current (DC) power into alternating current (AC) power and output the AC power to a power system. The control device includes a power generator simulation unit to generate a voltage command value for the power converter by simulating a characteristic of a synchronous power generator based on an AC voltage and an AC current in the power system, and a signal generation unit to generate a control signal for the power converter based on the voltage command value generated by the power generator simulation unit. The power generator simulation unit includes a first integrator to time-integrate a first difference between effective power calculated based on the AC voltage and the AC current and a target value of the effective power and output a first angular frequency, a second integrator to time-integrate the first angular frequency and output a phase of the AC voltage outputted from the power converter, and a voltage command generation unit to generate the voltage command value based on the AC voltage, a target value of the AC voltage, and the phase outputted from the second integrator. When a voltage difference between the AC voltage and the target value of the AC voltage is greater than a threshold, or when the AC current is greater than a reference current value, the first integrator outputs a difference between an angular frequency of the AC voltage and a reference angle frequency as the first angular frequency, regardless of a result of time integration of the first difference.

A power conversion device according to another embodiment includes a power converter to convert DC power into AC power and output the AC power to a power system, and a control device to control the power converter. The control device includes a power generator simulation unit to generate a voltage command value for the power converter by simulating a characteristic of a synchronous power generator based on an AC voltage and an AC current in the power system, and a signal generation unit to generate a control signal for the power converter based on the voltage command value generated by the power generator simulation unit. The power generator simulation unit includes a first integrator to time-integrate a first difference between effective power calculated based on the AC voltage and the AC current and a target value of the effective power and output a first angular frequency, a second integrator to time-integrate the first angular frequency and output a phase of the AC voltage outputted from the power converter, and a voltage command generation unit to generate the voltage command value based on the AC voltage, a target value of the AC voltage, and the phase outputted from the second integrator. When a voltage difference between the AC voltage and the target value of the AC voltage is greater than a threshold, or when the AC current is greater than a reference current value, the first integrator outputs a difference between an angular frequency of the AC voltage and a reference angle frequency as the first angular frequency, regardless of a result of time integration of the first difference.

Advantageous Effects of Invention

According to the present disclosure, control that simulates a synchronous power generator over a power converter can be stably performed, while suppressing an overcurrent.

DESCRIPTION OF EMBODIMENTS

Hereinafter, the present embodiment will be described with reference to the drawings. In the description below, identical parts will be designated by the same reference numerals. Their names and functions are also the same. Accordingly, the detailed description thereof will not be repeated.

<Overall Configuration>

Figure 1:
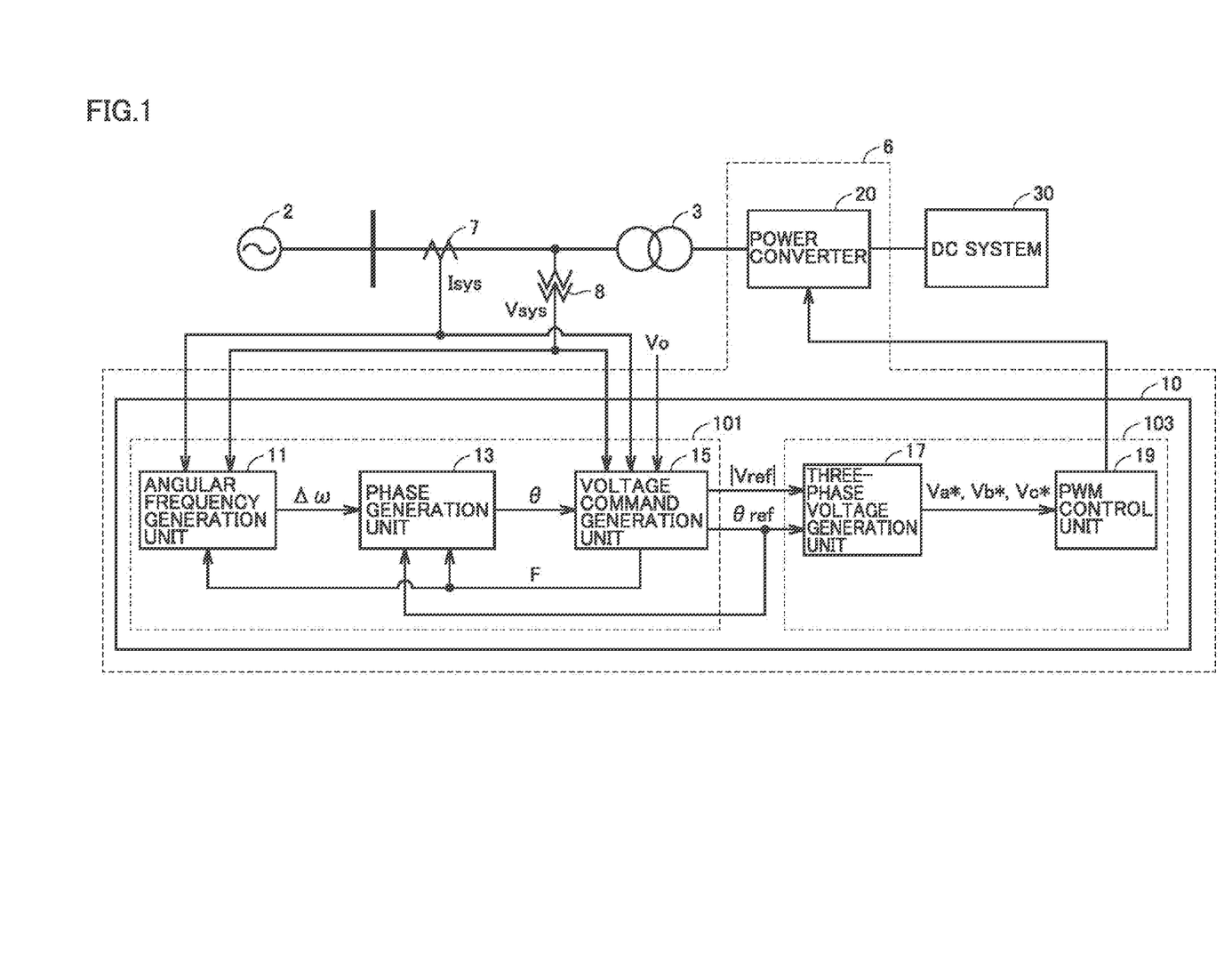
FIG. 1 is a view for illustrating an example of an overall configuration of a power conversion system.

FIG. 1 is a view for illustrating an example of an overall configuration of a power conversion system. The power conversion system includes a power system 2, a voltage transformer 3, a power conversion device 6, a current detector 7, a voltage detector 8, and a DC system 30. Power conversion device 6 includes a control device 10 and a power converter 20.

Power converter 20 is a power converter that performs power conversion between DC system 30 and power system 2. Specifically, power converter 20 is connected to power system 2 via voltage transformer 3, to convert DC power from DC system 30 into AC power and output the AC power to power system 2. Power converter 20 is, for example, a self-excited converter such as a two-level converter, a three-level converter, or a modular multilevel converter. Power system 2 is, for example, an AC system with three phases. DC system 30 is, for example, a DC transmission line.

Current detector 7 detects three-phase AC currents of power system 2. Specifically, current detector 7 detects an AC current Ia of an a phase, an AC current Ib of a b phase, and an AC current Ic of a c phase of power system 2. AC currents Ia, Ib, and Ic are inputted into control device 10. In the following, AC currents Ia, Ib, and Ic are also collectively referred to as an AC current Isys.

Voltage detector 8 detects three-phase AC voltages of power system 2. Specifically, voltage detector 8 detects an AC voltage Va of the a phase, an AC voltage Vb of the b phase, and an AC voltage Vc of the c phase of power system 2. AC voltages Va, Vb, and Vc are inputted into control device 10. In the following, AC voltages Va, Vb, and Vc are also collectively referred to as an AC voltage Vsys.

Control device 10 is a device that controls operation of power converter 20. Specifically, control device 10 includes a power generator simulation unit 101 and a signal generation unit 103, as main functional components. Each function of power generator simulation unit 101 and signal generation unit 103 is implemented by a processing circuit. The processing circuit may be dedicated hardware, or may be a CPU that executes programs stored in an internal memory of control device 10. When the processing circuit is dedicated hardware, the processing circuit is constituted, for example, by an FPGA, an ASIC, a combination thereof, or the like.

Power generator simulation unit 101 generates a voltage command value for power converter 20 by simulating a characteristic of a synchronous power generator based on AC voltage Vsys and AC current Isys in power system 2. Typically, power generator simulation unit 101 simulates a behavior of the synchronous power generator by solving a motion equation represented by the following equation (1).

[Equation 1]

$$Po - Pe - D\Delta\omega = M\frac{d\Delta\omega}{dt} \quad (1)$$

"Po" is a target value of effective power outputted from power converter 20 (hereinafter also referred to as an "effective power target value"). "Pe" is the effective power outputted from power converter 20. "M" is an inertia moment of the simulated power generator. "Δω" is a difference between an angular frequency ω of a rotor of the simulated power generator and a reference angle frequency ω0 of power system 2. "D" is a damping factor of the simulated power generator. Further, when a voltage phase angle (hereinafter also simply referred to as a "phase") of the simulated power generator is represented by "θ", the following equation (2) regarding phase θ holds.

[Equation 2]

$$\omega 0 + \Delta\omega = \frac{d\theta}{dt} \quad (2)$$

Specifically, power generator simulation unit 101 includes an angular frequency generation unit 11, a phase generation unit 13, and a voltage command generation unit 15.

Angular frequency generation unit 11 generates an angular frequency deviation Δω based on AC current Isys and AC voltage Vsys and a flag F from voltage command generation unit 15. Flag F is a flag indicating whether or not a voltage command value for current suppression is generated in voltage command generation unit 15. For example, when flag F is "1", flag F indicates that the voltage command value for current suppression is generated, and when flag F is "0", flag F indicates that the voltage command value for current suppression is not generated (that is, an ordinary voltage command value is generated). When flag F is "0", angular frequency generation unit 11 generates angular frequency deviation Δω by time integration according to equation (1), and when flag F is "1", angular frequency generation unit 11 generates a difference between an angular frequency ωs of AC voltage Vsys at present and reference angle frequency ω0 of power system 2, as angular frequency deviation Δω. Reference angle frequency ω0 is an angular frequency of a reference frequency (for example, 50 Hz or 60 Hz) of power in power system 2. A specific configuration of angular frequency generation unit 11 will be described later.

Phase generation unit 13 generates phase θ based on angular frequency deviation Δω generated by angular frequency generation unit 11, reference angle frequency ω0, and flag F and a phase θref from voltage command generation unit 15. When flag F is "0", phase generation unit 13 generates phase θ by time integration according to equation (2), and when flag F is "1", phase generation unit 13 generates phase θref of a voltage command value Vref for current suppression, as phase θ. Phase θref is a phase of voltage command value Vref generated by voltage command generation unit 15. A specific configuration of phase generation unit 13 will be described later.

Voltage command generation unit 15 generates voltage command value Vref for power converter 20 based on AC voltage Vsys of power system 2, a target value Vo of AC voltage Vsys (hereinafter also referred to as a target voltage Vo), and phase θ outputted from phase generation unit 13. In the following description, a magnitude (that is, an absolute value) of voltage command value Vref is indicated by |Vref|. The same applies to other voltages.

Voltage command generation unit 15 determines whether or not to suppress a current flowing into power converter 20, based on a voltage difference ΔV between AC voltage Vsys and target voltage Vo. When voltage difference ΔV is less than or equal to a threshold Th, voltage command generation unit 15 determines not to suppress the current. In this case, voltage command generation unit 15 generates ordinary voltage command value Vref by setting absolute value |Vref| to an absolute value |Vo| of target voltage Vo and setting phase θref to phase θ generated by phase generation unit 13. On the other hand, when voltage difference ΔV is greater than threshold Th, voltage command generation unit 15 determines to suppress the current. In this case, voltage command generation unit 15 generates voltage command value Vref for current suppression. A method for generating voltage command value Vref for current suppression will be described later.

When voltage command generation unit 15 determines to suppress the current, voltage command generation unit 15 sets the value of flag F to "1", and when voltage command generation unit 15 determines not to suppress the current, voltage command generation unit 15 sets the value of flag F to "0". Voltage command generation unit 15 outputs flag F to angular frequency generation unit 11 and phase generation unit 13.

Based on absolute value |Vref| of voltage command value Vref and phase θref generated by power generator simulation unit 101, signal generation unit 103 generates a control signal for power converter 20 and outputs the control signal to power converter 20. Specifically, signal generation unit 103 includes a three-phase voltage generation unit 17 and a PWM (Pulse Width Modulation) control unit 19.

Three-phase voltage generation unit 17 generates three-phase sinusoidal voltages Va*, Vb*, and Vc* based on absolute value |Vref| and phase θref from voltage command generation unit 15. Specifically, Va*=|Vref|×sin(θref), Vb*=|Vref|×sin(θref+2π/3), and Vc*=|Vref|×sin(θref+4π/3) are generated.

PWM control unit 19 performs pulse width modulation on each of three-phase sinusoidal voltages Va*, Vb*, and Vc* to generate a control signal as a PWM signal. PWM control unit 19 outputs the control signal to power converter 20. Typically, the control signal is a gate control signal for controlling ON and OFF of each switching element included in power converter 20.

<Hardware Configuration>

Figure 2:
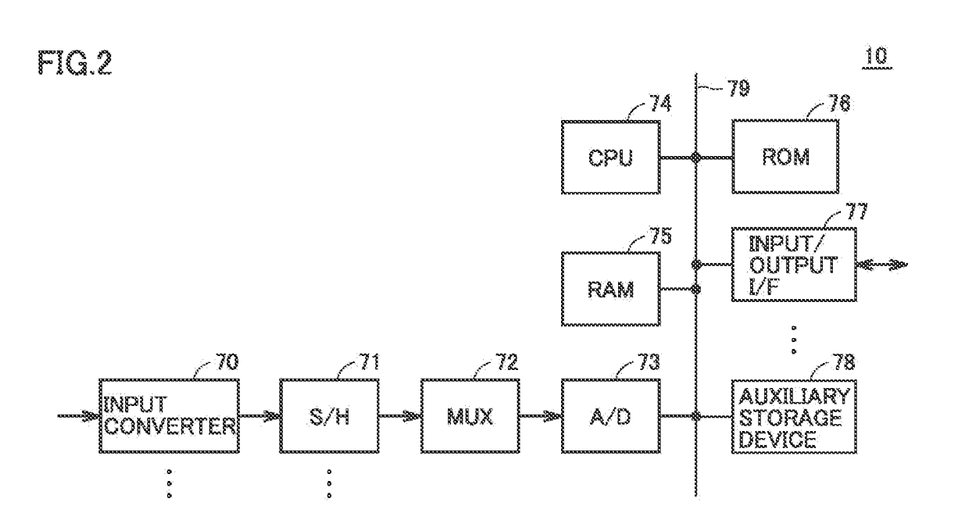
FIG. 2 is a view showing an exemplary hardware configuration of a control device.

FIG. 2 is a view showing an exemplary hardware configuration of control device 10. FIG. 2 shows an example in which control device 10 is constituted by a computer.

Referring to FIG. 2, control device 10 includes one or more input converters 70, one or more sample hold (S/H) circuits 71, a multiplexer (MUX) 72, an A/D converter 73, one or more CPU (Central Processing Units) 74, a RAM (Random Access Memory) 75, a ROM (Read Only Memory) 76, one or more input/output interfaces 77, and an auxiliary storage device 78. Further, control device 10 includes a bus 79 that mutually connects the components.

Input converter 70 has an auxiliary transformer for each input channel. Each auxiliary transformer converts signals detected by current detector 7 and voltage detector 8 in FIG. 1 into signals having a voltage level suitable for subsequent signal processing.

Sample hold circuit 71 is provided for each input converter 70. Sample hold circuit 71 samples a signal indicating the amount of electricity received from corresponding input converter 70 using a defined sampling frequency, and holds the signal.

Multiplexer 72 sequentially selects the signals held in a plurality of sample hold circuits 71. A/D converter 73 converts a signal selected by multiplexer 72 into a digital value. It should be noted that A/D conversion may be performed in parallel on detection signals of a plurality of input channels by providing a plurality of A/D converters 73.

CPU 74 controls entire control device 10, and performs arithmetic processing according to a program. RAM 75 as a volatile memory and ROM 76 as a nonvolatile memory are used as main storages for CPU 74. ROM 76 stores programs, set values for signal processing, and the like. Auxiliary storage device 78 is a nonvolatile memory having a capacity larger than that of ROM 76, and stores programs, data of electricity amount detection values, and the like.

Input/output interface 77 is an interface circuit in communicating between CPU 74 and an external device.

It should be noted that it is also possible to constitute at least a portion of control device 10 using a circuit such as an FPGA (Field Programmable Gate Array) and an ASIC (Application Specific Integrated Circuit), unlike the example in FIG. 2.

<Specific Configuration of Power Generator Simulation Unit>

Specific configurations of angular frequency generation unit 11, phase generation unit 13, and voltage command generation unit 15 of power generator simulation unit 101 will be described.

(Voltage Command Generation Unit)

A method for changing voltage command value Vref to suppress an overcurrent in voltage command generation unit 15 is itself the same as the disclosure in PTL 1.

Figure 3:
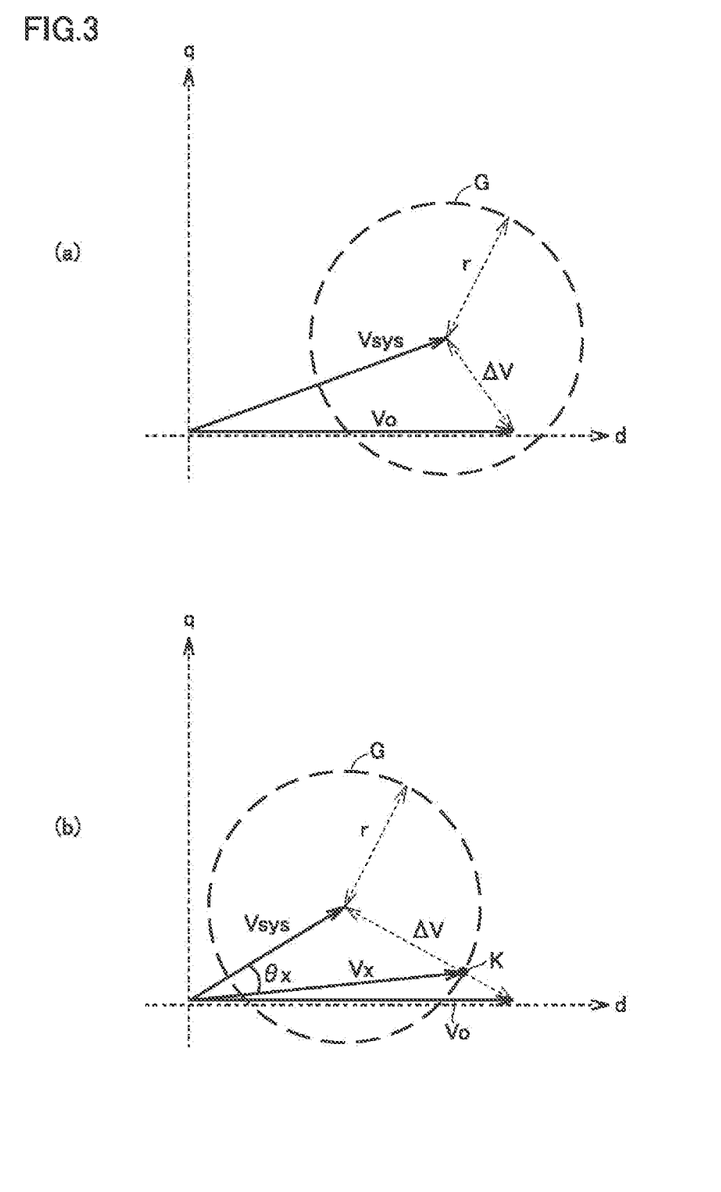
FIG. 3 is a view for illustrating a method for generating a voltage command value by a voltage command generation unit.

FIG. 3 is a view for illustrating a method for generating the voltage command value by the voltage command generation unit. Referring to FIG. 3, a voltage vector <Vo> obtained by transforming target voltage Vo into a rotating coordinate system having a d axis and a q axis and a voltage vector <Vsys> obtained by transforming AC voltage Vsys into the rotating coordinate system are shown in the rotating coordinate axes. Voltage vector <Vsys> is produced by an absolute value |Vsys| of AC voltage Vsys and a phase θsys, and voltage vector <Vo> is produced by absolute value |Vo| of target voltage Vo and phase θ generated by phase generation unit 13. Further, FIG. 3 shows a control circle G having a radius r, with a center at an end point of voltage vector <Vsys>. Radius r is a value set beforehand, and corresponds to threshold Th described above. It should be noted that it is assumed that dq transformation is performed based on a phase of a rotor of a virtual synchronous machine, and voltage vector <Vo> of target voltage Vo exists on the d axis.

FIG. 3(a) shows a case where power system 2 is relatively normal and voltage difference ΔV between voltage vector <Vsys> and voltage vector <Vo> is less than or equal to radius r (that is, a case where voltage vector <Vo> exists within control circle G). <ΔV> is represented by <ΔV>=|<Vo>−<Vsys>|. In this case, voltage command generation unit 15 determines that there is no need to suppress the current, and generates ordinary voltage command value Vref. Specifically, voltage command generation unit 15 sets absolute value |Vo| of voltage vector <Vo> as absolute value |Vref| of voltage command value Vref, and sets phase θ of voltage vector <Vo> (that is, phase θ outputted from phase generation unit 13) as phase θref of voltage command value Vref. Further, voltage command generation unit 15 sets the value of flag F to "0".

FIG. 3(b) shows a case where power system 2 is disturbed and voltage difference ΔV between voltage vector <Vsys> and voltage vector <Vo> is greater than radius r (that is, a case where voltage vector <Vo> exists outside control circle G). In this case, voltage command generation unit 15 determines that there is a need to suppress the current, and generates voltage command value Vref for current suppression.

Specifically, voltage command generation unit 15 produces a voltage vector <Vx> that starts from the origin and ends at an intersection point K. Intersection point K is an intersection point between control circle G and a straight line connecting the end point of voltage vector <Vsys> with an end point of voltage vector <Vo>. Voltage command generation unit 15 sets an absolute value |Vx| of voltage vector <Vx> as absolute value |Vref| of voltage command value Vref, and sets a phase θx of voltage vector <Vx> as phase θref of voltage command value Vref. Further, voltage command generation unit 15 sets the value of flag F to "1".

Figure 4:
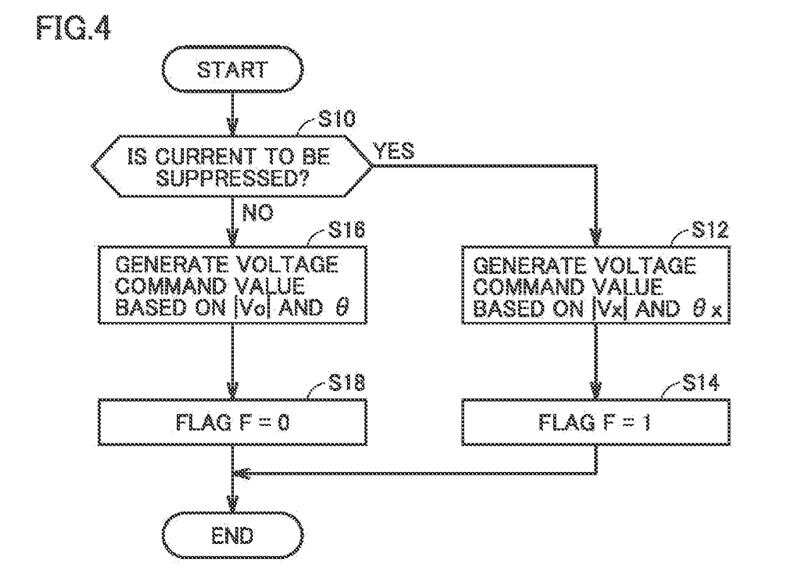
FIG. 4 is a flowchart showing an example of a processing procedure of the voltage command generation unit.

FIG. 4 is a flowchart showing an example of a processing procedure of the voltage command generation unit. Each step in FIG. 4 is typically performed by a processing circuit of control device 10. Referring to FIG. 4, voltage command generation unit 15 determines whether or not to suppress the current (step S10). Specifically, when voltage difference ΔV between AC voltage Vsys and target voltage Vo is less than or equal to threshold Th (that is, radius r of control circle G), voltage command generation unit 15 determines not to suppress the current, and when voltage difference ΔV is greater than threshold Th, voltage command generation unit 15 determines to suppress the current.

When the current is to be suppressed (YES in step S10), voltage command generation unit 15 generates voltage command value Vref based on absolute value |Vx| and phase θx in order to suppress the current (step S12). Then, voltage command generation unit 15 sets flag F to "1" (step S14).

When the current is not to be suppressed (NO in step S10), voltage command generation unit 15 generates voltage command value Vref based on absolute value |Vo| and phase θ (step S16). Then, voltage command generation unit 15 sets flag F to "0" (step S18).

(Angular Frequency Generation Unit)

Figure 5:
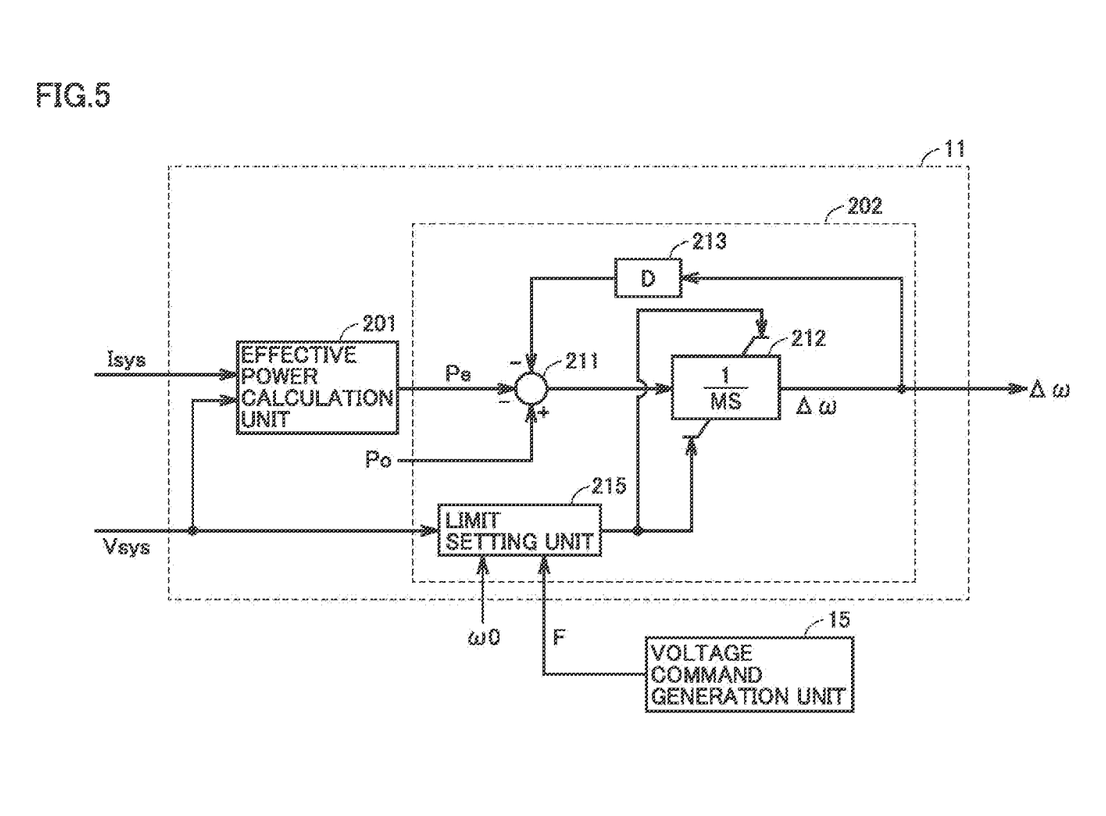
FIG. 5 is a block diagram showing specific functional components of an angular frequency generation unit.

FIG. 5 is a block diagram showing specific functional components of angular frequency generation unit 11. Referring to FIG. 5, angular frequency generation unit 11 includes an effective power calculation unit 201 and an angular frequency arithmetic unit 202.

Effective power calculation unit 201 calculates effective power Pe of power system 2 at present, based on AC current Isys detected by current detector 7 and AC voltage Vsys detected by voltage detector 8.

Angular frequency arithmetic unit 202 includes a subtractor 211, an integrator (denoted as "1/MS" in the drawing) 212, a proportioner (denoted as "D" in the drawing) 213, and a limit setting unit 215.

Limit setting unit 215 sets a limit value of integrator 212 based on AC voltage Vsys, reference angle frequency ω0, and flag F from voltage command generation unit 15. Specifically, when flag F is "0" (that is, when the current is not to be suppressed), limit setting unit 215 sets an upper limit value of integrator 212 to +∞, and sets a lower limit value thereof to −∞. That is, limit setting unit 215 does not limit an output value of integrator 212.

On the other hand, when flag F is "1" (that is, when the current is to be suppressed), limit setting unit 215 sets both of the upper limit value and the lower limit value to "ωs−ω0", which is a difference value between angular frequency ωs of AC voltage Vsys and reference angle frequency ω0 of power system 2. That is, limit setting unit 215 limits the output value of integrator 212 to "ωs−ω0".

Subtractor 211 subtracts an output value of proportioner 213 from a difference ΔP between effective power target value Po and effective power Pe. Effective power target value Po is set as appropriate by a system operator. The output value of proportioner 213 is a multiplication value "D×Δω" calculated by multiplying angular frequency deviation Δω by damping factor D. By subtracting multiplication value "D×Δω", angular frequency arithmetic unit 202 simulates a damping force that the synchronous power generator has in the control of power converter 20. It should be noted that a configuration that the output value of proportioner 213 is not inputted into subtractor 211 may be adopted.

Integrator 212 time-integrates an output value of subtractor 211 and outputs angular frequency deviation Δω. It should be noted that, when the output value of proportioner 213 is not inputted into subtractor 211, integrator 212 time-integrates difference ΔP between effective power target value Po and effective power Pe and outputs angular frequency deviation Δω.

When the upper limit value and the lower limit value are not limited by limit setting unit 215 (that is, when voltage difference ΔV is less than or equal to threshold Th), integrator 212 outputs a value obtained by time-integrating the output value of subtractor 211 (or difference ΔP), as angular frequency deviation Δω. On the other hand, when the upper limit value and the lower limit value are limited to "ωs−ω0" by limit setting unit 215 (that is, when voltage difference ΔV is greater than threshold Th), integrator 212 outputs "ωs−ω0" as angular frequency deviation Δω, regardless of the result of time integration described above. Angular frequency deviation Δω corresponds to a difference between angular frequency ωs of AC voltage Vsys at present and reference angle frequency ω0 of power system 2.

As described above, in angular frequency generation unit 11, when voltage command value Vref for current suppression is generated by voltage command generation unit 15 (that is, when flag F is "1"), "ωs−ω0" is set to angular frequency deviation Δω, regardless of the result of time integration of the output value of subtractor 211. The reason therefor will be described below.

Voltage command value Vref for current suppression (hereinafter also referred to as a voltage command value Vref*) is a voltage command value based on absolute value |Vx| and phase θx. Thus, voltage command value Vref* is a voltage command value that is not based on angular frequency deviation Δω and phase θ according to equation (1) and equation (2). When a time for which voltage command value Vref* is outputted increases, it leads to increase in a difference J between angular frequency deviation Δω outputted by integrator 212 by means of time integration and the angular frequency deviation between angular frequency ωs of AC voltage Vsys and reference angle frequency ω0 of power system 2. As a result, step-out may occur in control that simulates the synchronous power generator.

In the present embodiment, when the current is to be suppressed, integrator 212 outputs the difference value "ωs−ω0" between angular frequency ωs of AC voltage Vsys at present and reference angle frequency ω0 of power system 2, as angular frequency deviation Δω, and thereby can prevent increase in difference J described above. Therefore, occurrence of step-out can be prevented while suppressing an overcurrent, and when disturbance of power system 2 is settled, it becomes easy to return to the control that simulates the synchronous power generator.

Figure 6:
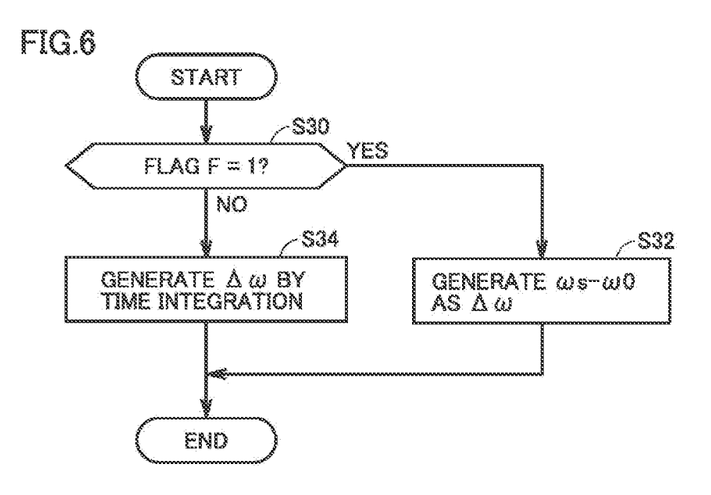
FIG. 6 is a flowchart showing an example of a processing procedure of the angular frequency generation unit.

FIG. 6 is a flowchart showing an example of a processing procedure of angular frequency generation unit 11. Each step in FIG. 6 is typically performed by a processing circuit of control device 10. Referring to FIG. 6, angular frequency generation unit 11 determines whether or not flag F is "1" (step S30).

When flag F is "1" (YES in step S30), angular frequency generation unit 11 generates the difference value "ωs−ω0" between angular frequency ωs of AC voltage Vsys at present and reference angle frequency ω0 of power system 2, as angular frequency deviation Δω (step S32). When flag F is "0" (NO in step S30), angular frequency generation unit 11 generates angular frequency deviation Δω by time-integrating the output value of subtractor 211 (step S34).

(Phase Generation Unit)

Figure 7:
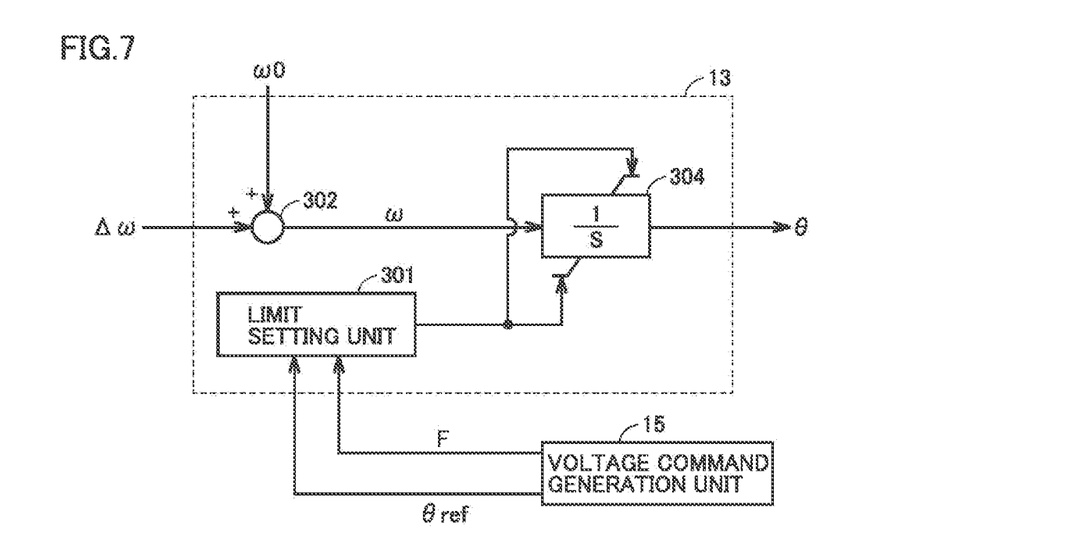
FIG. 7 is a block diagram showing specific functional components of a phase generation unit.

FIG. 7 is a block diagram showing specific functional components of the phase generation unit. Referring to FIG. 7, phase generation unit 13 includes a limit setting unit 301, an adder 302, and an integrator 304.

Limit setting unit 301 sets a limit value of integrator 304 based on phase θref of voltage command value Vref and flag F. Specifically, when flag F is "0" (that is, when the current is not to be suppressed), limit setting unit 301 sets an upper limit value of integrator 304 to +∞, and sets a lower limit value thereof to −∞. That is, limit setting unit 301 does not limit an output value of integrator 304.

On the other hand, when flag F is "1" (that is, when the current is to be suppressed), limit setting unit 301 sets both of the upper limit value and the lower limit value to phase θref. When flag F is "1", phase θref is equal to phase θx, and thus the upper limit value and the lower limit value are set to phase θx. That is, limit setting unit 301 limits the output value of integrator 304 to "θx".

Adder 302 outputs angular frequency ω (=Δω+ω0) obtained by adding angular frequency deviation Δω generated by angular frequency generation unit 11 to reference angle frequency ω0. Integrator 304 time-integrates angular frequency ω, and outputs phase θ of AC voltage Vsys outputted from power converter 20.

When the upper limit value and the lower limit value are not limited by limit setting unit 301 (that is, when voltage difference ΔV is less than or equal to threshold Th), integrator 304 outputs a value obtained by time-integrating an addition value (that is, angular frequency ω) calculated by adding angular frequency deviation Δω to reference angle frequency ω0, as phase θ. When the upper limit value and the lower limit value are limited to "θx" by limit setting unit 301 (that is, when voltage difference ΔV is greater than threshold Th), integrator 304 outputs phase θx of voltage command value Vref* for current control generated by voltage command generation unit 15, as phase θ.

As described above, in phase generation unit 13, when voltage command value Vref* for current suppression is generated, "θx" is set to phase θ, regardless of the result of time integration of an output value of adder 302. This is for the same reason as that for setting angular frequency deviation Δω to "ωs−ω0" when voltage command value Vref* for current suppression is generated.

Specifically, when the control signal generated by signal generation unit 103 is outputted to power converter 20 based on voltage command value Vref*, power converter 20 outputs AC voltage Vsys with phase θx. That is, the phase of power system 2 is set to "θx". When the time for which voltage command value Vref* is outputted is long, it leads to increase in a difference between phase θ as a result of time integration by integrator 304 and phase θx of power system 2. In the present embodiment, when the current is to be suppressed, integrator 304 outputs phase θx of power system 2 as phase θ, and thereby can prevent increase in the difference described above. Therefore, occurrence of step-out can be prevented while suppressing an overcurrent, and when disturbance of power system 2 is settled, it becomes easier to return to the control that simulates the synchronous power generator.

Figure 8:
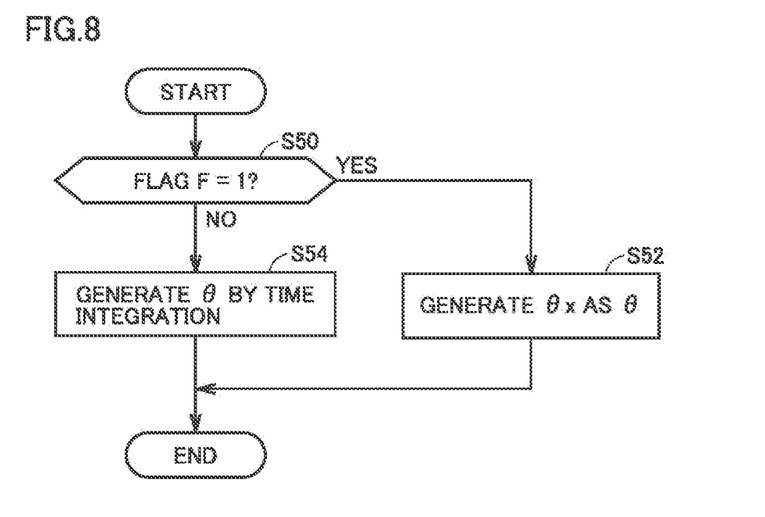
FIG. 8 is a flowchart showing a processing procedure of the phase generation unit.

FIG. 8 is a flowchart showing a processing procedure of phase generation unit 13. Referring to FIG. 8, when flag F is "1" (YES in step S50), phase generation unit 13 generates phase θx of voltage command value Vref* as phase θ (step S52). On the other hand, when flag F is "0" (NO in step S50), phase generation unit 13 generates phase θ by time-integrating the addition value calculated by adding angular frequency deviation Δω to reference angle frequency ω0 (step S54).

OTHER EMBODIMENTS (1) The embodiment described above has described a configuration that limits outputs of integrator 212 of angular frequency generation unit 11 and of integrator 304 of phase generation unit 13 at the time of current suppression. However, the present disclosure is not limited to such a configuration. For example, a configuration that limits only an output of integrator 212 of angular frequency generation unit 11 may be adopted. In this case, integrator 212 outputs the difference value "ωs−ω0" between angular frequency ωs of AC voltage Vsys at present and reference angle frequency ω0 of power system 2, as angular frequency deviation Δω. Since phase generation unit 13 calculates phase θ by performing time integration based on adjusted angular frequency deviation Δω, it is considered that the difference between calculated phase θ and the phase of power system 2 is not great. Therefore, even with such a configuration, control that simulates the synchronous power generator over power converter 20 can be stably performed. Further, according to such a configuration, the function of limiting the output value of integrator 304 can be omitted, and thereby processing burden on control device 10 can be reduced.

(2) The embodiment described above has described a configuration that voltage command generation unit 15 determines whether or not to suppress the current flowing into power converter 20 based on voltage difference ΔV between AC voltage Vsys and target voltage Vo. However, the present disclosure is not limited to such a configuration.

For example, voltage command generation unit 15 may determine whether or not to suppress the current flowing into power converter 20 based on AC current Isys and a reference current value Ith. Specifically, when AC current Isys is less than or equal to reference current value Ith, voltage command generation unit 15 determines not to suppress the current. When AC current Isys is greater than reference current value Ith, voltage command generation unit 15 determines to suppress the current.

The processing after the processing of determining whether or not to suppress the current is the same as the processing in steps S12 to S18 in FIG. 4. Specifically, when the current is not to be suppressed, voltage command generation unit 15 generates voltage command value Vref based on absolute value |Vo| and phase θ, and sets flag F to "0". When the current is to be suppressed, voltage command generation unit 15 generates voltage command value Vref based on absolute value |Vx| and phase θx, and sets flag F to "1".

(3) The configuration illustrated as the embodiment described above is an example of the configuration of the present disclosure, and can be combined with another known technique, or can be modified, such as partially omitted, in a scope without departing from the gist of the present disclosure. Further, in the embodiment described above, the processing and configuration described in another embodiment may be appropriately adopted and implemented.

It should be understood that the embodiment disclosed herein is illustrative and non-restrictive in every respect. The scope of the present disclosure is defined by the scope of the claims, rather than the description above, and is intended to include any modifications within the scope and meaning equivalent to the scope of the claims.

REFERENCE SIGNS LIST

2: power system; 3: voltage transformer; 6: power conversion device; 7: current detector; 8: voltage detector; 10: control device; 11: angular frequency generation unit; 13: phase generation unit; 15: voltage command generation unit; 17: three-phase voltage generation unit; 19: PWM control unit; 20: power converter; 30: DC system; 70: input converter; 71: sample hold circuit; 72: multiplexer; 73: A/D converter; 74: CPU; 75: RAM; 76: ROM; 77: input/output interface; 78: auxiliary storage device; 79: bus; 101: power generator simulation unit; 103: signal generation unit; 201: effective power calculation unit; 202: angular frequency arithmetic unit; 211: subtractor; 212, 304: integrator; 213: proportioner; 215, 301: limit setting unit; 302: adder.

The invention claimed is:

1. A control device for controlling a power converter to convert DC power into AC power and output the AC power to a power system, the control device comprising:
a power generator simulation unit to generate a voltage command value for the power converter by simulating a characteristic of a synchronous power generator based on an AC voltage and an AC current in the power system; and
a signal generation unit to generate a control signal for the power converter based on the voltage command value generated by the power generator simulation unit, wherein
the power generator simulation unit includes
a first integrator to time-integrate a first difference between effective power calculated based on the AC voltage and the AC current and a target value of the effective power, and output a first angular frequency,
a second integrator to time-integrate the first angular frequency and output a phase of the AC voltage outputted from the power converter, and
a voltage command generation unit to generate the voltage command value based on the AC voltage, a target value of the AC voltage, and the phase outputted from the second integrator, and
when a voltage difference between the AC voltage and the target value of the AC voltage is greater than a threshold, or when the AC current is greater than a reference current value, the first integrator outputs a difference between an angular frequency of the AC voltage and a reference angle frequency as the first angular frequency, regardless of a result of time integration of the first difference.

2. The control device according to claim 1, wherein, when the voltage difference is less than or equal to the threshold, or when the AC current is less than or equal to the reference current value, the first integrator outputs the result of time integration of the first difference as the first angular frequency.

3. The control device according to claim 1, wherein, when the voltage difference is greater than the threshold, or when the AC current is greater than the reference current value, the second integrator outputs a phase of the voltage command value generated by the voltage command generation unit, as the phase of the AC voltage outputted from the power converter, regardless of a result of time integration of the first angular frequency.

4. The control device according to claim 1, wherein, when the voltage difference is less than or equal to the threshold, or when the AC current is less than or equal to the reference current value, the second integrator outputs a value obtained by time-integrating an addition value calculated by adding the first angular frequency to the reference angle frequency, as the phase of the AC voltage outputted from the power converter.

5. The control device according to claim 4, wherein
the voltage command generation unit transforms the AC voltage and the target value of the AC voltage into a rotating coordinate system having a d axis and a q axis, and defines a control circle with a center at the AC voltage,
when the voltage difference is greater than the threshold, or when the AC current is greater than the reference current value, the voltage command generation unit generates a voltage vector to an intersection point between the control circle and a straight line connecting a vector of the target value of the AC voltage with a vector of the AC voltage, sets a magnitude of the voltage vector as a magnitude of the voltage command value, and sets a phase of the voltage vector as a phase of the voltage command value, and
the threshold is a radius of the control circle.

6. The control device according to claim 5, wherein, when the voltage difference is less than or equal to the threshold, or when the AC current is less than or equal to the reference current value, the voltage command generation unit sets a magnitude of the target value of the AC voltage as the magnitude of the voltage command value, and sets the phase outputted from the second integrator as the phase of the voltage command value.

7. A power conversion device comprising:
a power converter to convert DC power into AC power and output the AC power to a power system; and a control device to control the power converter,
the control device including
- a power generator simulation unit to generate a voltage command value for the power converter by simulating a characteristic of a synchronous power generator based on an AC voltage and an AC current in the power system, and
- a signal generation unit to generate a control signal for the power converter based on the voltage command value generated by the power generator simulation unit, wherein the power generator simulation unit includes
- a first integrator to time-integrate a first difference between effective power calculated based on the AC voltage and the AC current and a target value of the effective power, and output a first angular frequency,
- a second integrator to time-integrate the first angular frequency and output a phase of the AC voltage outputted from the power converter, and
- a voltage command generation unit to generate the voltage command value based on the AC voltage, a target value of the AC voltage, and the phase outputted from the second integrator, and when a voltage difference between the AC voltage and the target value of the AC voltage is greater than a threshold, or when the AC current is greater than a reference current value, the first integrator outputs a difference between an angular frequency of the AC voltage and a reference angle frequency as the first angular frequency, regardless of a result of time integration of the first difference.

8. The control device according to claim 2, wherein, when the voltage difference is greater than the threshold, or when the AC current is greater than the reference current value, the second integrator outputs a phase of the voltage command value generated by the voltage command generation unit, as the phase of the AC voltage outputted from the power converter, regardless of a result of time integration of the first angular frequency.

9. The control device according to claim 2, wherein, when the voltage difference is less than or equal to the threshold, or when the AC current is less than or equal to the reference current value, the second integrator outputs a value obtained by time-integrating an addition value calculated by adding the first angular frequency to the reference angle frequency, as the phase of the AC voltage outputted from the power converter.

10. The control device according to claim 3, wherein, when the voltage difference is less than or equal to the threshold, or when the AC current is less than or equal to the reference current value, the second integrator outputs a value obtained by time-integrating an addition value calculated by adding the first angular frequency to the reference angle frequency, as the phase of the AC voltage outputted from the power converter.

* * * * *